(No Model.)

W. KINNE & J. KASTNER.
CULTIVATOR SHOVEL.

No. 332,156. Patented Dec. 8, 1885.

Witnesses
W. J. King.
F. S. Chapman

Inventor.
William Kinne,
Joseph Kastner
By L. Deane
Their Attorney.

United States Patent Office.

WILLIAM KINNE AND JOSEPH KASTNER, OF HOLTON, KANSAS.

CULTIVATOR-SHOVEL.

SPECIFICATION forming part of Letters Patent No. 332,156, dated December 8, 1885.

Application filed August 28, 1885. Serial No. 175,548. (No model.)

*To all whom it may concern:*

Be it known that we, WILLIAM KINNE and JOSEPH KASTNER, citizens of the United States, residing at Holton, in the county of Jackson and State of Kansas, have invented certain new and useful Improvements in Cultivator-Shovels, of which the following is a specification, reference being had therein to the accompanying drawings.

Figure 1:
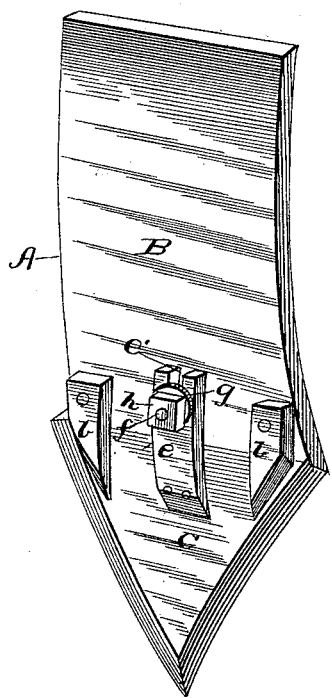
Figure 2:
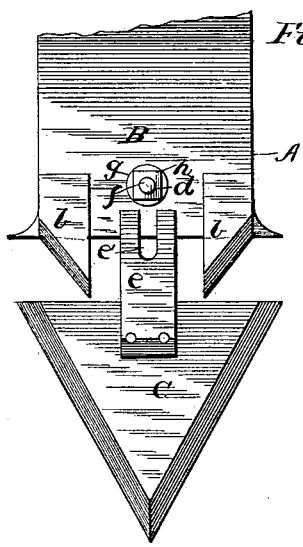
Figure 3:
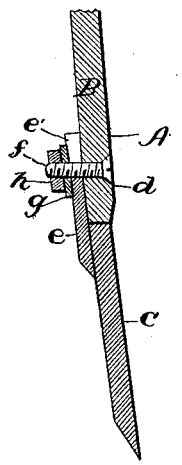

Figure 1 is a perspective view of the shovel entire, showing fastening, &c. Fig. 2 is a rear elevation of the parts detached, showing mode of fastening same to upper part, A A, of shovel. Fig. 3 is a vertical central section of the shovel.

Farmers, especially those growing corn in our western States, are very much troubled by the cost and time required to keep their cultivator-shovels sharp. The most serious of these objections is the delay at the time when the early growing crop needs working, and the work must be done with the greatest speed. Consequently there is need for a shovel that can take the place of the dullest shovel at the same and generally very much less expense than getting the dullest shovel sharpened. In this invention the aim is to supply the desired device by means of a shovel made in two parts, the lower being the point. The two parts can be united rigidly together for work; or the point or power part may, when occasion requires, be readily separated from the upper part and a new point attached, which point can be easily and quickly reunited to the other part.

We will now proceed to explain this invention in detail.

In the accompanying drawings, A denotes a cultivator-shovel composed of the upper part, B, and the lower part, C. Integral with or in any desired way fastened to the lower edge of B are the lugs or blocks $b$, a portion of each of which extends down beyond this edge or end of B. There are preferably two of these lugs, and they are placed one on each side, equidistant from the center. In the center of this part of the shovel, and a little above its lower end or edge, is the slot or opening $d$. The point C is of triangular shape, and at its upper end or base has a central lug, $e$, which is cast with or secured to the body. It projects somewhat above the upper edge or end. Its upper end is forked or slotted at $e'$.

It will be obvious that the two parts can be easily united by placing them together end to end. The projecting parts of the lugs or blocks $b$ will come under the upper part of the point, and the upper end of the lug $e$ will lap under the lower end or edge of the upper part, B. A headed screw-threaded bolt, $f$, can now be put through the opening $d$ and slot $e$, and secured by a washer, $g$, and nut $h$. Thus the two parts of the shovel can be united in the firmest and most rigid manner, and can, when desired, be separated as easily. The farmer only needs a wrench for these purposes, and he can always carry that with him.

Having now described our invention, what we consider new and wish to protect by Letters Patent, is—

1. A cultivator-shovel made in two parts, the upper part having a projecting lug on each side at its lower edge or end, and the lower part provided with a central slotted or forked lug projecting above its upper edge or end, and both parts united by bolt and nut, all as described and set forth.

2. In a cultivator-shovel, the combination of the upper part, B, having lugs $b$ at its lower end, and opening $d$, with the point C, having at its upper end or edge the slotted or forked lug $e$ and the bolt $f$, washer $g$, and nut $h$, all as and for the purposes set forth.

In testimony whereof we have affixed our signatures in presence of two witnesses.

WILLIAM KINNE.
JOSEPH KASTNER.

Witnesses:
THOS. QUAKENBUSH,
JOU F. HOAGLIN.